March 23, 1954
G. LEE
2,672,993
POWER-DRIVEN ROLLS FOR LUMBER TRAILERS
Filed July 12, 1951
2 Sheets-Sheet 1
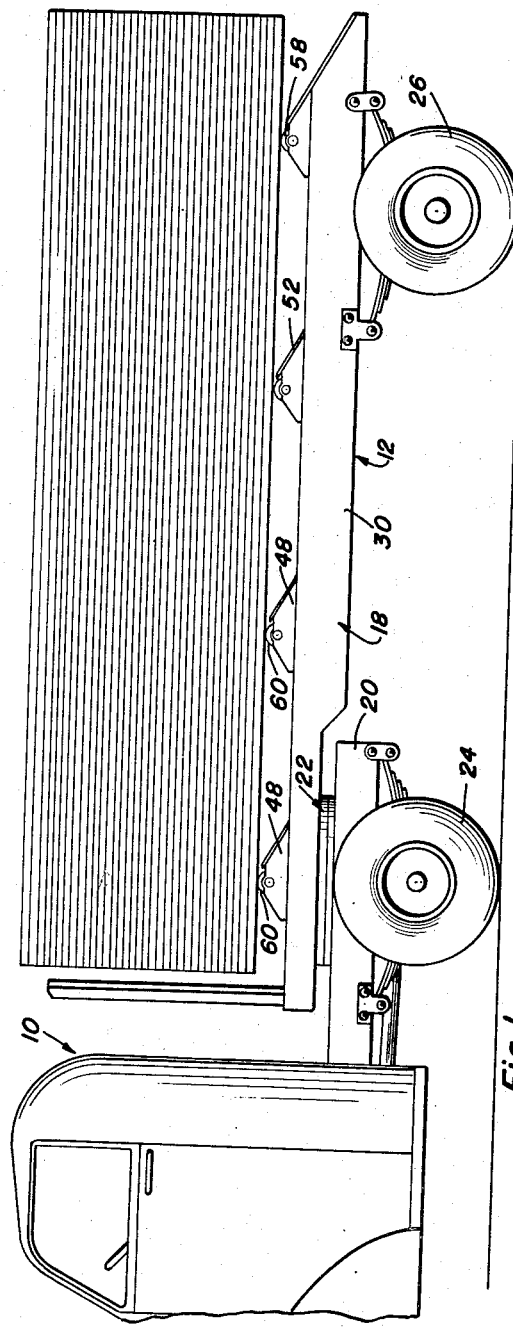
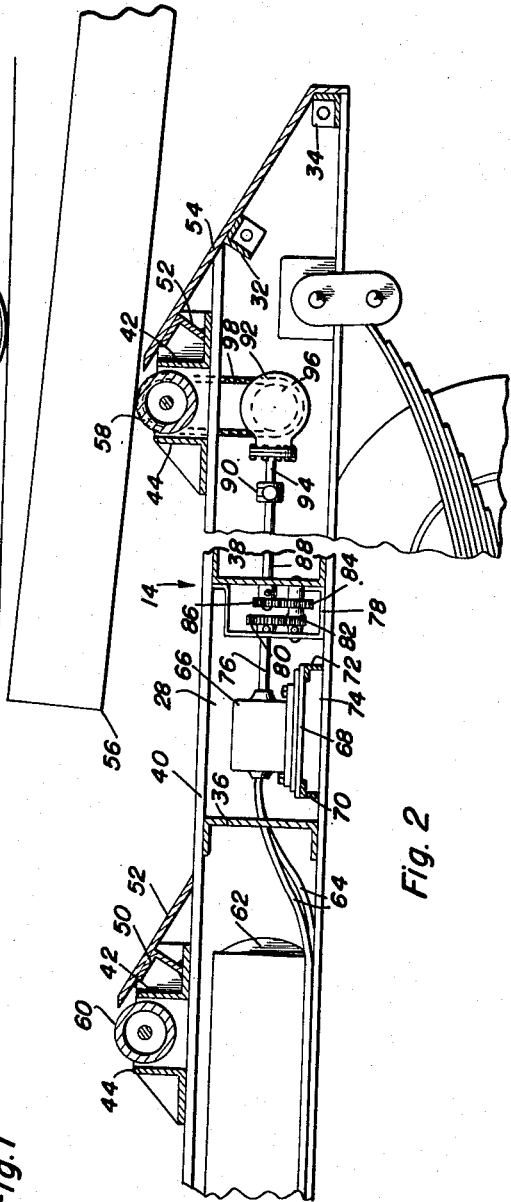
Glen Lee
INVENTOR.
BY
*Clarence A. O'Brien*
*and Harvey B. Jacobson*
Attorneys March 23, 1954  G. LEE  2,672,993
POWER-DRIVEN ROLLS FOR LUMBER TRAILERS
Filed July 12, 1951  2 Sheets-Sheet 2
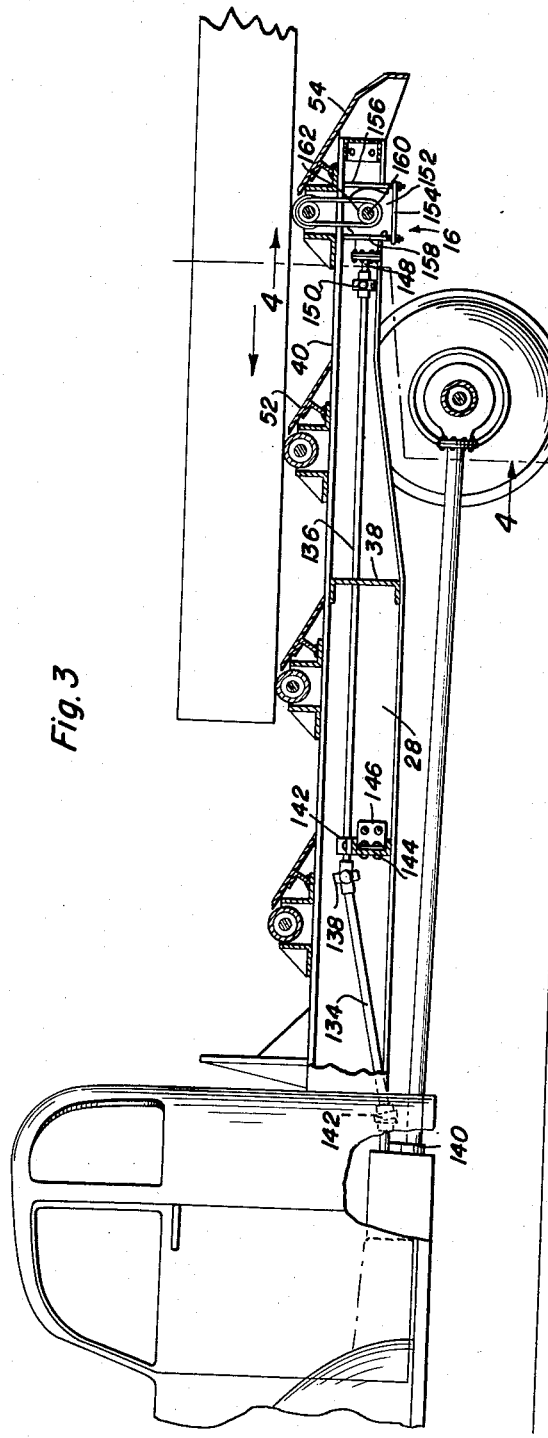
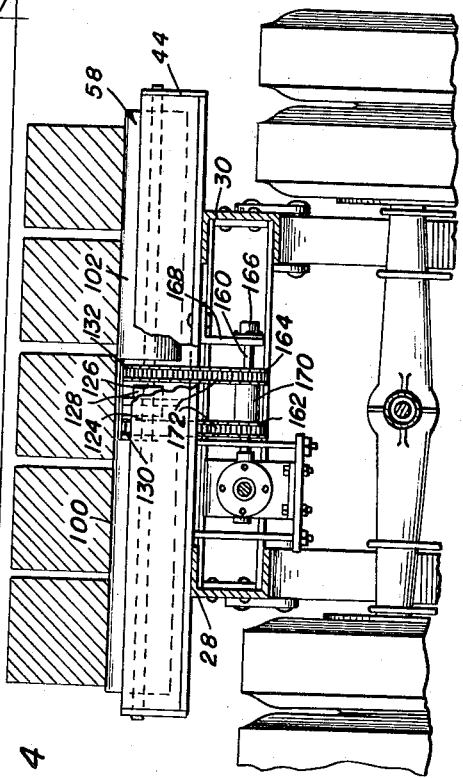
Glen Lee
INVENTOR.

Patented Mar. 23, 1954

2,672,993

UNITED STATES PATENT OFFICE 2,672,993

POWER-DRIVEN ROLLS FOR LUMBER TRAILERS

Glen Lee, John Day, Oreg.

Application July 12, 1951, Serial No. 236,356

5 Claims. (Cl. 214—84)

The present invention relates to improvements in lumber trailers and more particularly to a means provided for effecting rotation of one of the rolls of a lumber trailer whereby lumber can be easily loaded on or unloaded from a trailer.

The primary object of this invention is to provide power driven rolls suitable for use on either lumber trailers or trucks or both, and which rolls may be driven either forward or backward to facilitate either loading or unloading of such vehicles.

An object of the present invention resides in the provision of means driven by the power take-off of a truck, the means being connected to the rearmost roll of a trailer for effecting rotation thereof whereby loading and unloading of lumber can be facilitated.

A further object of the present invention resides in the provision of means driven by pressure supplied by the engine of a truck whereby the rear roll of the trailer can be rotated for aiding in the loading and unloading of a trailer.

Still another object of the present invention resides in the novel construction of the rearmost roll whereby the same can be positively rotated and wherein the roll is constructed to effectively lubricate the bearing supports therefor.

Various other objects and advantages will become apparent from the detailed description to follow. The best forms in which I have contemplated applying my invention are clearly illustrated in the accompanying drawings, wherein:

Figure 1 is a side elevational view of a conventional trailer truck adapted for carrying lumber and to which the present invention is applied;

Figure 2 is a vertical longitudinal sectional view through a portion of the trailer of Figure 1 showing the first form of means for operating the rearmost roller, parts being broken away;

Figure 3 is a side elevational view of a portion of the trailer truck, parts being shown in section for exposing the second form of means for driving the rearmost roller;

Figure 4 is a vertical transverse sectional view taken substantially along the plane of line 4—4 of Figure 3; and Figure 5 is a detail sectional view through a portion of one of the rollers of the trailer.

Referring more particularly to the drawings, wherein like numerals designate like parts throughout, the numeral 10 designates generally the truck, while the numeral 12 designates generally the lumber trailer for the truck. The first form of means for driving the rear roll is designated generally by the numeral 14 and is best shown in Figure 2. The second form of means driving the rear roll is designated generally by the numeral 16 and is best shown in Figures 3 and 4.

Looking now at Figures 1 and 2, it will be seen that the truck and trailer 10 and 12 are of conventional form, the frame 18 of the trailer being pivotally secured to the frame 20 of the truck 10 by means of the fifth wheel 22. The truck is supported on wheels 24 while the trailer has rear supporting wheels 26.

The frame 18 is comprised of longitudinal side members 28 and 30 joined by the angle irons 32 and 34 at each end. The side frame members 28 and 30 are also joined by a pair of channel iron members 36 and 38. Planking 40 covers the upper surface of the frame 18.

On top of the planking 40 is placed a plurality of pairs of angle irons 42, 44 which are disposed transversely of the trailer and have their ends joined by the bearing plates 48. The angle irons 42 have reduced size angle irons 50 secured in angular relation thereto whereby the inclined plates 52 can be welded thereto. The rearmost angle iron 42 has an elongated inclined plate 54 secured to the angle iron 52 and the angle irons 32 and 34. The plates 52 and 54 provide means for guiding the end portions 56 of pieces of lumber onto the rolls 58 and 60. The rolls 58 and 60 are rotatably journaled on the plates 48 in a manner to be more fully described hereinafter.

The first form of means 14 for driving the rear roll 58 includes the provision of a pressure reservoir 62 which is connected to the engine whereby the same can be maintained at predetermined pressure. Air hoses 64 interconnect the reservoir 62 with a conventional air motor 66 which is mounted on the supporting plate 68 carried by the angle irons 70 and 72, the angle irons 70 and 72 extending transversely of the trailer and supported by the lower portion 74 of the channel iron side members 28 and 30. The air motor 66 has a drive shaft 76 extending therefrom.

The bracket 78 is secured to the channel iron transverse member 38 and has a plurality of gears 80, 82, 84 and 86 rotatably carried thereby and interconnected. The gear 80 is connected to the shaft 76 for rotation thereby, the gear 86 being driven by the gear train. The gear 86 is fixedly mounted on the shaft 88 which extends through the channel iron member 38 to the flexible coupling 90. The gear housing 92 is supported on the trailer and has several gearings (not shown) whereby the shaft 94 connected to the coupling 90 can effect rotation of the sprocket 96. The sprocket 96 is interconnected with the rear roll 58 by means of the chain 98. It will thus be seen that the rear roll 58 can be driven by air pressure from the chain 62 whereby the lumber can be loaded onto the trailer in the fashion shown in Figure 2.

Looking now at Figures 4 and 5, it will be seen that the rear roll 58 is comprised of a pair of sections 100 and 102 of hollow cylindrical form and having end closures 104. The sections 100 and 102 have closure plugs 106 threadably engaged in openings formed therein whereby oil or other lubricant 108 can be placed within the hollow section. The end closures 104 have bores at 110 to receive the shafts 112 which are keyed at 114. The end closures 104 are also provided at passages at 116 whereby the oil 108 can be sent to the shafts 112 adjacent their end portions. The shafts 112 extend outwardly of the closure plates 104 to provide pintles 118 which are rotatably journaled in the bearing plates 48 and in the bearing elements 120 welded thereto. Thrust washers 122 are interposed between the end closures 104 and the bearing elements 120. It will thus be seen that the lubricant 108 can be sent through the bleed passages 116 for supplying oil to the bearings for the pintles 118, giving longer life to the rolls of the trailer.

The juxtaposed pintles 124 and 126 of the sections 100 and 102 are rotatably journaled in the bearing bracket 128 between the sections. Each of the pintles 124 and 126 is provided with a sprocket at 130 and 132.

The drive means 16 is comprised of a flexible shaft including sections 134 and 136 connected by the universal joint 138. The section 134 is connected to the power take-off shaft 140 by means of the universal coupling 142. The section 136 is rotatably journaled in the bearing bracket 142 carried on the channel iron cross member 144 extending transversely of the trailer and secured to the side frame members 28 and 30 by means of the angle irons 146. The section 136 extends through the channel iron transverse member 38 and has its ends connected to the shaft 148 by means of the universal connection 150.

The gear housing 152 is supported on the platform 154, the platform 154 being supported by the rods 156 and 158 secured to the underside of the planking 40. The housing 152 is provided with beveled gears whereby the shaft 148 is drivingly connected to the shaft 160 which has the sprockets 162 and 164 secured thereto. The outer end of the shaft 160 is rotatably journaled in the bearing 166 carried by the angle iron 168. The sprockets 162 and 164 are maintained in predetermined spaced relation by means of the sleeve 170. Sprocket chains 172 are engaged over the sprockets 162 and 164 and the sprockets 130 and 132, respectively.

It will thus be seen that the rear roll 58 can be rotated by means of the power take-off shaft 140 whereby the lumber can be loaded onto the trailer with ease.

It is to be noted that by the use of the means of the present invention, the old method of loading and unloading lumber on a trailer can be obviated. The elimination of the old practice of effecting forward and reverse jerking movement of the truck and trailer will reduce accidents and increase the efficiency with which the trailer is loaded and unloaded.

In view of the foregoing description taken in conjunction with the drawings, it is believed that means have been provided which will accomplish all of the objects hereinabove set forth.

Having described the invention, what is claimed as new is:

1. A lumber roll attachment for trucks comprising a pair of spaced, parallel members adapted to be mounted crosswise at the rear of a truck bed, bearing plates joining the ends of said members, roll means disposed between said members and being rotatably journaled in said bearing plates, said roll means having a portion thereof disposed above said parallel members, an inclined deflecting plate secured to one of said members and adapted to depend rearwardly from a truck bed, means on said deflecting plate for attaching the same to the truck frame, said deflecting plate constituting a guide for guiding lumber onto said roll means and drive means on said roll means for operatively connecting the same to a source of power on the truck, said roll means comprising a pair of shafts in alignment with each other, the opposite ends of said shafts being rotatably journaled in said bearing plates, a bearing bracket disposed between said parallel members, the adjacent ends of said shafts being journaled in said bearing bracket, and a hollow roll mounted on each of said shafts.

2. The combination of claim 1 including a pair of sprockets mounted on the adjacent ends of said shafts, said sprockets constituting said drive means.

3. A lumber roll attachment for trucks comprising a pair of spaced, parallel members adapted to be mounted crosswise at the rear of a truck bed, bearing plates joining the ends of said members, roll means disposed between said members and being rotatably journaled in said bearing plates, said roll means having a portion thereof disposed above said parallel members, an inclined deflecting plate secured to one of said members and adapted to depend rearwardly from a truck bed, means on said deflecting plate for attaching the same to the truck frame, said deflecting plate constituting a guide for guiding lumber onto said roll means and drive means on said roll means for operatively connecting the same to a source of power on the truck, said spaced parallel members comprising angle irons, one leg of each iron being adapted to rest on the truck bed, the other leg of each iron being adapted to extend perpendicularly to the truck bed, an auxiliary angle iron mounted on one of said first mentioned angle irons and being secured at its ends to said bearing plates, one leg of said auxiliary angle iron being inclined from the horizontal, said deflecting plate being secured to said inclined leg.

4. In combination with a truck bed, a lumber roll attachment comprisng a plurality of lumber roll mounting assemblies spacedly secured along the bed and being transversely disposed across the bed, each assembly comprising a pair of spaced angle members secured to the bed, brackets secured to and bridging the ends of each pair of angle members, a pair of aligned shafts extending between and parallel to each pair of angle members and being journaled at their outer ends in said brackets, lumber rolls mounted on each shaft and being spaced from one another exposing the inner ends of the shafts, a bearing bracket journaling and supporting the inner end of each shaft.

5. In combination with a truck bed, a lumber roll attachment comprising a plurality of lumber roll mounting assemblies spacedly secured along the bed and being transversely disposed across the bed, each assembly comprising a pair of spaced angle members secured to the bed, brackets secured to and bridging the ends of each pair of angle members, a pair of aligned shafts extending between and parallel to each pair of angle members and being journaled at their outer ends in said brackets, lumber rolls mounted on each shaft and being spaced from one another exposing the inner ends of the shafts, a bearing bracket journaling and supporting the inner end of each shaft, drive means operatively connected to the inner ends of the shafts of the rearmost lumber roll mounting assembly for rotating these shafts, the shafts of the other lumber roll mounting assemblies being freely rotatable.

GLEN LEE.

References Cited in the file of this patent

UNITED STATES PATENTS

| Number | Name | Date |
|---|---|---|
| 151,253 | Tothammer et al. | May 26, 1874 |
| 775,997 | Streich | Nov. 29, 1904 |
| 1,041,319 | McGarry | Oct. 15, 1912 |
| 1,142,672 | Clayton | June 8, 1915 |
| 1,165,719 | Sears | Dec. 28, 1915 |
| 1,204,049 | Maxwell | Nov. 7, 1916 |
| 1,597,094 | Manly | Aug. 24, 1926 |
| 2,087,846 | Jahn | July 20, 1937 |
| 2,156,438 | Suverkrup | May 2, 1939 |
| 2,451,620 | Holmes | Oct. 19, 1948 |
| 2,518,293 | De Anguera | Aug. 8, 1950 |
| 2,604,219 | Alvare | July 22, 1952 |
| 2,606,678 | Penberthy et al. | Aug. 12, 1952 |